Jan. 1, 1946.  B. M. CHRISTENSON  2,391,945
BUNDLE RACK FOR BICYCLES
Filed Jan. 24, 1945   2 Sheets-Sheet 1
Fig. 1.
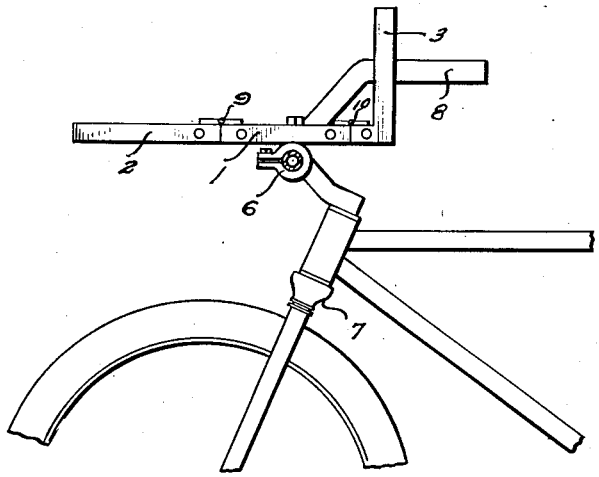
Fig. 2.
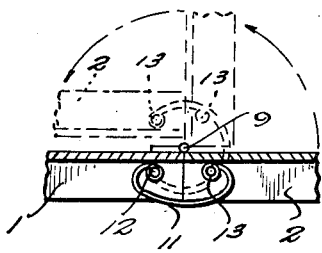
Fig. 7.
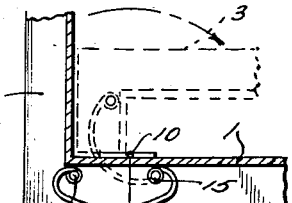
Fig. 8.
Inventor
Ben M. Christenson,
By Clarence A. O'Brien
and Harvey B. Jacobson
Attorneys Jan. 1, 1946. B. M. CHRISTENSON 2,391,945
BUNDLE RACK FOR BICYCLES
Filed Jan. 24, 1945 2 Sheets-Sheet 2
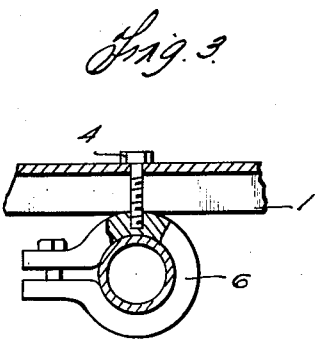
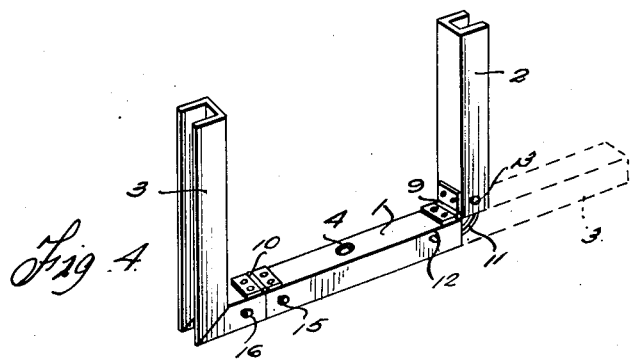
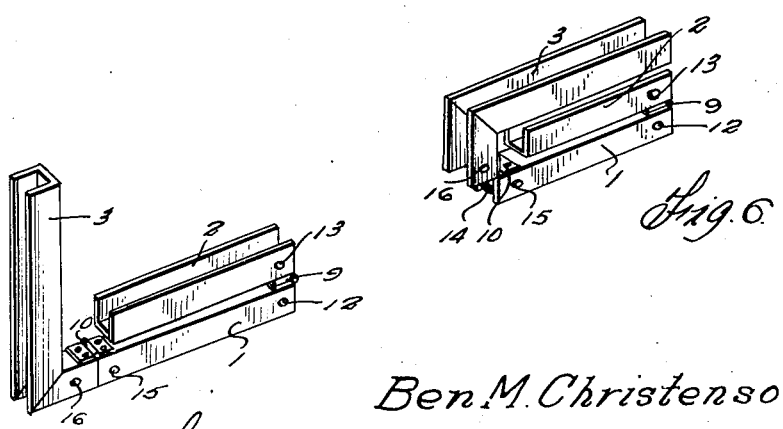
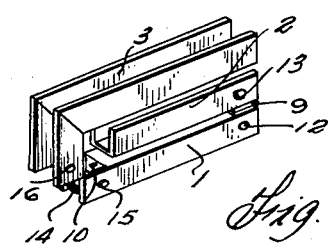
Inventor
Ben M. Christenson,
By Clarence A. O'Brien
and Harvey B. Jacobson
Attorneys Patented Jan. 1, 1946

2,391,945

UNITED STATES PATENT OFFICE 2,391,945

BUNDLE RACK FOR BICYCLES

Ben M. Christenson, Pasadena, Calif.

Application January 24, 1945, Serial No. 574,342

1 Claim. (Cl. 224—36)

My invention relates to improvements in bundle-carrying racks for bicycles, the primary object in view being to provide a rack of simple form and inexpensive construction adapted for coaction with the handle bars of a bicycle to form a bundle carrier, for newspapers particularly, and which is foldable when not in use into compact form and an out-of-the-way position, and readily attachable to and detachable from the handle bar clamp of present day bicycles.

Other and subordinate objects, also comprehended by my invention, together with the precise nature of my improvements, and the advantages thereof, will be readily understood when the succeeding description and claim are read with reference to the drawings accompanying and forming part of this specification.

In said drawings:

Figure 1 is a fragmentary view in side elevation, partly in section, illustrating my improved bundle rack in a preferred embodiment thereof applied and with the front bar section swung into horizontally aligned position and butt joint relation with respect to the base bar section, and the rear bar section swung into upstanding position, Figure 2 is a view in front elevation, Figure 3 is a view partly in section and partly in side elevation illustrating the means for attaching the base bar section to the handle bar clamp, the parts being drawn to an enlarged scale, Figure 4 is a view in perspective of the bundle rack detached and showing the front bar section swung into intermediate upright position, Figure 5 is a similar view illustrating the front bar section folded, Figure 6 is another similar view illustrating the front and rear bar sections both folded, Figure 7 is a fragmentary view in longitudinal section illustrating the spring means for maintaining the front bar section in horizontally aligned position and urging the same toward folded position, Figure 8 is a similar view illustrating the spring means for the rear bar section.

Referring to the drawings by numerals, my improved bundle carrier, as shown, comprises, as its basic elements, a base bar section 1, a straight front bar section 2, and a rear L-shaped bar section 3.

The base bar section 1 is provided substantially mid-way of its ends with a suitable bolt hole 4 therein by means of which and a bolt 5 threaded into the usual handle bar clamp 6 of a bicycle 7, said bar 1 is fixed to said clamp 6 to extend crosswise of the handle bars 8 in substantially horizontal position.

The front bar section 2 is hinged, at one end, to the front end of the base bar section 1, as at 9, for vertical swinging movement, the arrangement being such that said front bar section may be swung into horizontally aligned position and butt joint relation with respect to the base bar section 1 and also into either a vertical upstanding position, or into a folded position over said base bar section 1 substantially parallel therewith.

The rear bar section 3 is hinged, at one end, as at 10, to the rear end of the base bar section 1 to be swung into upstanding position in butt joint relation to the base bar section 1, and into folded position over the front bar section 2 when the latter is folded.

The base, front and rear bar sections 1, 2, 3 are of channel iron form with closed faces uppermost, or innermost, as the case may be, to present such flat faces to bundles, not shown, contained in the rack, and to form housings for spring means for maintaining the front and rear bar sections 2, 3 in their different positions, and now to be described.

A C-shaped leaf spring 11 of the type in which the ends thereof tend to draw together is anchored at said ends to the hinged-together ends of the base and front bar sections 1, 2 by pivot pins 12, 13 extending between the sides of said bar sections 1, 2 with said spring housed in said sections. The arrangement of pins 12, 13 is such that when the front bar section 2 is swung into horizontal position, as shown, for instance, in Figure 7, the pull of the spring 11 is below the hinge 9 whereby the front bar section 2 is yieldingly held in horizontally aligned butt joint relation to the base bar section 1. Also, the arrangement of said pins 12, 13, and the spring 11, is such that when the front bar section 2 is swung into upright position in which it is approximately at a right angle to the base bar section 1, the pull of the spring 11 is in a line in the rear of the hinge 9, as best shown in Figure 7 by dotted lines. Thus, said spring 11 tends to urge said front bar section 2 toward folded position and when said bar section 2 is folded to maintain the same in folded position, as shown in dot-and-dash lines in Figure 7.

A spring 14, similar to spring 11, is similarly anchored by pivot pins 15, 16 to the hinged ends of the base bar section 1 and the rear bar section 3 so as to maintain said bar 3 either in upright butt joint relation to the base bar section 1, or in folded position, as shown in dotted lines in Figure 8.

As will now be seen, the described bundle rack is adapted to form in conjunction with handle bars 8 of the "box" type a secure rest for bundles, such as newspapers and the like, placed in the rack so as to rest in part on the handle bars.

The described bundle rack may be used either with the front bar section 2 in horizontally aligned position relative to the base bar section 1, as shown for instance in Figure 1, or with said section 2 swung into the upright position described. When said bar section 2 is swung into upright position, said bar under the action of the spring 13 serves to clamp bundles in the rack between said bar section 2 and the rear bar section 3. When not in use, both bar sections 2, 3 may be swung into the folded positions previously described and in which the same are out of the way and the rack folded into compact form.

The foregoing will, it is believed, suffice to impart a clear understanding of my invention together with the manifold advantages thereof.

Manifestly, the invention, as described, is susceptible of modifications without departing from the inventive concept, and right is herein reserved to such modifications as fall within the scope of the appended claim.

What I claim is:

A bundle rack for attachment to the handle bar clamp of a bicycle comprising a base bar section adapted to be attached intermediate the ends thereof to said clamp to extend crosswise of said handle bars, a straight front bar section hinged at one end to one end of the base bar section for vertical swinging movement thereon, said front bar section being swingable into horizontally aligned position and butt joint relation with respect to said base bar section and also swingable to fold the same over said base bar section, and into an intermediate upstanding position, spring means anchored to the hinged ends of said base and front bar sections and tending to maintain said front bar section in horizontally aligned position and urging the same toward folded position when said front section is swung into intermediate position, a rear bar section of right angled form hinged at one end to the other end of said base bar section to be swung into upstanding position and butt joint relation to the base bar section and folded over the front bar section when the latter is folded, and spring means anchored to the hinged ends of said rear end base bar sections and tending to maintain said rear bar section in upright and folded positions, respectively.

BEN M. CHRISTENSON.